(No Model.)
J. B. CANNON.
BOG CUTTER.
No. 569,170.   Patented Oct. 13, 1896.
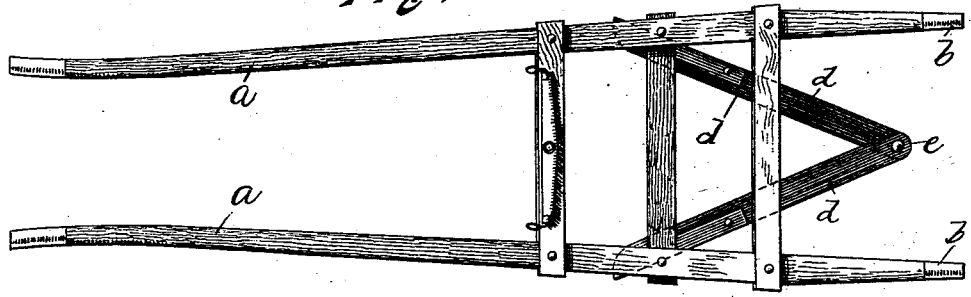
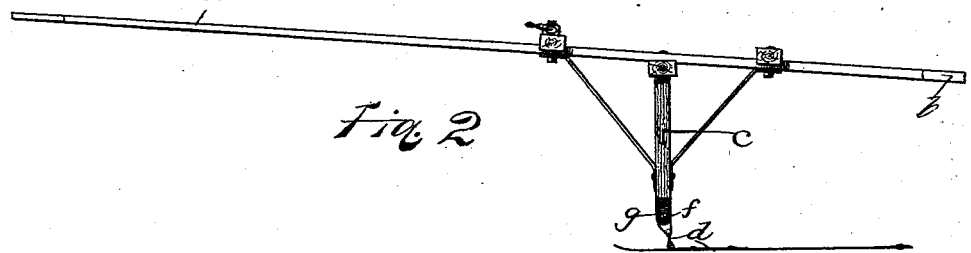
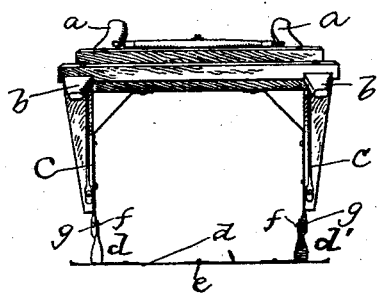
Witnesses
Andrew Ferguson
C. E. Buckland
Inventor
John B. Cannon,
By W. E. Simonds
Attorney

UNITED STATES PATENT OFFICE.

JOHN B. CANNON, OF WEST SUFFIELD, CONNECTICUT.

BOG-CUTTER.

SPECIFICATION forming part of Letters Patent No. 569,170, dated October 13, 1896.

Application filed July 10, 1895. Serial No. 555,562. (No model.)

*To all whom it may concern:*

Be it known that I, JOHN B. CANNON, a citizen of the United States of America, residing at West Suffield, in the county of Hartford and State of Connecticut, have invented a certain new and useful Improvement in Bog-Cutters, of which the following is a description, reference being had to the accompanying drawings, wherein—

Figure 1 is a top view. Fig. 2 is a side view. Fig. 3 is a rear elevation.

The object of the improvement is the production of a device to be drawn by a horse or other animal for cutting bogs; and the invention resides in the features of construction described hereinafter, and specified in the claim.

In the accompanying drawings, the letter $a$ denotes shafts, between which the horse or other animal is to be hitched to the device. These shafts are to be extended rearward to form the handles $b$ for the operator. Midway between the shafts and the handles there are attached the two uprights $c$, stoutly braced in both directions. The letter $d$ denotes a V-shaped knife with its mouth opening toward the front of the machine and made practically of two knives, which are at their rear ends attached by the pivot $e$. This knife (or these knives) are attached to the feet of the uprights $c$ by pivot-pins $f$, mediately upon the twisted shank $d'$, and this pivotal attachment allows the knife as a whole to rise and fall with the ground over which it is being drawn, meanwhile resting thereupon, it being made thereby to take the best position for attacking and removing a bog. These pivot-pins $f$ are practically screws carrying nuts $g$, and these nuts can be so tightened as to hold the knife in any desired adjustment permitted by its pivotal motion last described.

I claim as my improvement—

In combination, the shafts $a$ each extended to form a handle $b$, the uprights $c$ and the two knife-blades pivoted together at the rear end and pivotally and adjustably attached to said uprights through the medium of bolts and nuts, all substantially as described.

JOHN B. CANNON.

Witnesses:
A. HALLADAY,
A. C. ALLEN.